United States Patent
Waller et al.

(10) Patent No.: US 9,675,963 B2
(45) Date of Patent: Jun. 13, 2017

(54) AMMONIA OXIDATION CATALYST FOR THE PRODUCTION OF NITRIC ACID BASED ON YTTRIUM-GADOLINIUM ORTHO COBALTATES

(71) Applicant: YARA INTERNATIONAL ASA, Oslo (NO)

(72) Inventors: David Waller, Porsgrunn (NO); Marianne Søbye Grønvold, Porsgrunn (NO); Nibal Sahli, Skien (NO)

(73) Assignee: YARA INTERNATIONAL ASA, Oslo (NO)

( * ) Notice: Subject to any disclaimer, the term of this patent is extended or adjusted under 35 U.S.C. 154(b) by 0 days.

(21) Appl. No.: 14/762,503

(22) PCT Filed: Jan. 24, 2014

(86) PCT No.: PCT/EP2014/051426
§ 371 (c)(1),
(2) Date: Jul. 22, 2015

(87) PCT Pub. No.: WO2014/114763
PCT Pub. Date: Jul. 31, 2014

(65) Prior Publication Data
US 2015/0367330 A1 Dec. 24, 2015

(30) Foreign Application Priority Data
Jan. 28, 2013 (NO) .................................... 20130146

(51) Int. Cl.
*B01J 23/889* (2006.01)
*B01J 23/00* (2006.01)
*C01B 21/26* (2006.01)
*B01D 53/94* (2006.01)
*B01J 23/83* (2006.01)

(52) U.S. Cl.
CPC .......... *B01J 23/8892* (2013.01); *B01D 53/94* (2013.01); *B01D 53/9436* (2013.01); *B01J 23/002* (2013.01); *B01J 23/83* (2013.01); *C01B 21/265* (2013.01); *B01D 2255/206* (2013.01); *B01D 2255/2061* (2013.01); *B01D 2255/2073* (2013.01); *B01D 2255/20746* (2013.01); *B01J 2523/00* (2013.01)

(58) Field of Classification Search
CPC ...... B01J 23/8892; B01J 23/83; B01J 23/002; B01J 2523/00; B01D 53/9436; B01D 53/94; B01D 2255/20746; B01D 2255/2073; B01D 2255/2061; B01D 2255/206; C01B 21/265
See application file for complete search history.

(56) References Cited

U.S. PATENT DOCUMENTS

| 3,888,792 A | 6/1975 | Hughes |
| 8,728,435 B2 | 5/2014 | Larcher et al. |
| 2010/0158784 A1 | 6/2010 | Estenfelder et al. |
| 2010/0278709 A1 | 11/2010 | Waller |
| 2012/0088936 A1 | 4/2012 | Kaneko et al. |
| 2013/0164494 A1 | 6/2013 | Estenfelder et al. |

FOREIGN PATENT DOCUMENTS

| EP | 2 202 201 | 6/2010 |
| RU | 2374348 | 5/2009 |
| WO | 2006/010904 | 2/2006 |
| WO | 2009/054728 | 4/2009 |

OTHER PUBLICATIONS

International Search Report issued Apr. 9, 2014 in International Application No. PCT/EP2014/051426.
Written Opinion of the International Searching Authority issued Apr. 9, 2014 in International Application No. PCT/EP2014/051426.
Norwegian Search Report issued Jul. 11, 2013 in corresponding Norwegian patent application No. 20130146.
Gina Pecchi et al: "Catalytic performance in methane combustion of rare-earth perovskites $RECo_{0.50}Mn_{0.50}O_3$ (RE: La, Er, Y)", Catalysis Today, Elsevier, NL, vol. 72, No. 1, Feb. 14, 2011, pp. 111-117, XP028275045.
Zhang, Yamel et al., "Microstructure and Oxygen Absorption Properties of $Y_{1-x} Gd_x BaCo_4O_{7\delta}$"; Journal of the Chinese Ceramic Society, Guisuanyan Xuebao (Feb. 2012), 40(2), pp. 289-293.
Russian Patent Office Search Report, received Dec. 20, 2016, in corresponding Russian Patent Application No. 2015133717/04(051846).
Korean Office Action, dated Dec. 16, 2016, issued in corresponding Korean Patent Application No. 10-2015-7021828.

*Primary Examiner* — Anthony J Zimmer
(74) *Attorney, Agent, or Firm* — Wenderoth, Lind & Ponack, L.L.P.

(57) ABSTRACT

The present invention relates to a catalytically active component of a catalyst, which comprises single phase oxides, based on a mixed yttrium-gadolinium ortho-cobaltate oxide systems, methods for the oxidation of ammonia and hydrocarbon in the presence of said catalytically active component and the use thereof.

16 Claims, No Drawings

AMMONIA OXIDATION CATALYST FOR THE PRODUCTION OF NITRIC ACID BASED ON YTTRIUM-GADOLINIUM ORTHO COBALTATES

FIELD OF THE INVENTION

The present invention relates to a catalytically active component of a catalyst, which comprises single phase oxides, based on a mixed yttrium-gadolinium ortho-cobaltate oxide systems, catalysts comprising the catalytically active component, methods for the oxidation of ammonia and hydrocarbon in the presence of said catalysts comprising said catalytically active component and the use thereof.

BACKGROUND OF THE INVENTION

Currently, nitric acid is produced industrially via the catalytic oxidation of ammonia, over a platinum or platinum alloy-based gauze catalyst. This process, known as the Ostwald process, has essentially remained unchanged, since its inception in the first decades of the twentieth century. Ostwalds's patent was dated 1902 and when combined with Haber's development of synthesising ammonia, in 1908, the basis for the commercial production of nitric acid, which we use today, was in place.

The combustion of ammonia is carried out over a platinum-based metal or alloy catalyst in the form of a gauze or mesh or net. A number of gauzes are installed together, and they constitute the gauze pack. The upper-most gauzes have compositions optimised for the combustion of ammonia, and are referred to as the combustion gauzes. Gauzes with other compositions may be located below the combustion gauzes, and these may have other roles, as described below. The whole stack of gauzes is referred to as the gauze pack. The gauzes are produced either by weaving or knitting.

The operating temperatures of the plants are typically 830 to 930° C. and the range of pressures is from 100 kPa to 1500 kPa. Typically, the combustion gauzes are installed in the plant for between six months and two years, depending on the plant operating conditions. Plants operating at high pressures typically have shorter campaigns than low-pressure plants.

The duration of the campaign is governed by a loss in the selectivity of the catalyst, towards the desired nitric oxide product, through the increased formation of unwanted nitrogen and nitrous oxide by-products. The loss of selectivity is related to a number of phenomena. During combustion, platinum is lost through the formation of $PtO_2$ vapour. Some of the platinum may be recovered by the installation of palladium metal-based gauzes, directly below the platinum-based combustion gauzes. The $PtO_2$ vapour alloys with the palladium, therefore, platinum is retained in the catalytically active zone. However, due to the depletion of platinum in the upper combustion zone of the gauze pack, not all of the ammonia is immediately combusted. If the ammonia is combusted in the palladium gauze region, the selectivity towards nitric oxide is reduced, and secondly, if ammonia and nitric oxide coexist in the vapour phase for a period of time, nitric oxide is reduced by ammonia, through a homogeneous reaction. This leads to both nitric oxide and ammonia losses. A final mechanism for loss of selectivity is related to the fact that the platinum is lost from the combustion gauzes at a higher rate than the other alloying elements (typically rhodium). This leads to rhodium enrichment of the gauze surface which leads to selectivity loss.

Over the last sixty years, many attempts have been made to replace the expensive platinum-based combustion catalyst with lower cost catalysts, based for example on metal oxides. To date, the only commercially available oxide-based catalyst for ammonia combustion was developed by Incitec Ltd (Australia). This is based on a cobalt oxide phase. However, in terms of its selectivity of combustion of ammonia to the desired nitric oxide product, its performance is inferior to that of platinum-based systems. The cobalt oxide based systems have shown selectivity levels of circa 90%, in commercial units, compared to the 94 to 98% achieved with platinum-based catalysts.

The use of mixed oxides with the perovskite structure, such as rhombohedral lanthanum cobaltate, as catalysts for ammonia oxidation, has received much attention. However, when considering the conditions that the catalyst is subjected to in industrial ammonia oxidation, it can clearly be seen that they are not suitable for stability reasons. Ammonia oxidation on an industrial scale, takes place at temperatures from 830 to 930° C. and at pressures from 100 kPa to 1500 kPa. The concentration of ammonia is in the range of 8.5 to 12 mol %, depending on plant conditions, with the remainder of the gas consisting of air. Thus the gas feed for oxidation has a composition of approximately 10 mol % $NH_3$, 18.7 mol % $O_2$ and the balance being nitrogen. When the ammonia is oxidised to NOx ($NO+NO_2$), with an efficiency of 95%, the gas composition is approximated by 9.5% NOx, 6% $O_2$ and 15% water vapour (The balance of gas composition is nitrogen and some 800 to 2000 ppm of $N_2O$). Thus the ammonia oxidation catalyst is subjected to high temperatures and a gas environment that contains oxygen and water vapour. These are the ideal conditions for the evaporation of metal ions, in the form of hydroxides and oxyhydroxides. Thus material will be lost from the catalytic reaction zone as vapour phase species, which will in-turn be deposited downstream in a cooler zone of the reactor system.

If considering evaporation from mixed oxides (those that contain more than one metal component), it most often has an incongruent evaporation process. This is the situation where one component in the oxide has a higher evaporation rate than another or than the others. If considering the lanthanum cobaltate perovskite system, when heated in an atmosphere containing oxygen and water vapour, cobalt species, such as CoOOH, have much higher vapour pressures than the dominant lanthanum species $La(OH)_3$. The effect of this is that cobalt evaporates to a larger extent than lanthanum—thus incongruent evaporation. The result of preferential cobalt evaporation is that in time, the non-stoichiometry limit of the lanthanum cobalt perovskite X will be exceeded ($LaCo_{1-x}O_3$ where X and $0<X\approx<0.03$). When the limit is exceeded, $La_2O_3$ will be precipitated. When operating, $La_2O_3$ does not have a negative effect on the catalyst performance. However, when the plant is shut-down or when it trips, the oxide catalyst is exposed to the ambient air. On cooling in air, the free-$La_2O_3$ will hydrate; forming $La(OH)_3$. One mole of $La_2O_3$ will form two moles of $La(OH)_3$, which involves a 50% expansion of the volume of the free-lanthanum species. This results in a mechanical disintegration of the catalyst.

Different perovskite type oxidation catalysts are known for use in different oxidation reactions. Examples of such catalysts and reactions are mentioned below.

WO 2006/010904 relates to an oxidation process wherein a perovskite oxidation catalyst of the formula $ABO_3$ in which A is one or more metal cations selected from bismuth and the lanthanide metals and B represents one or more metal cations selected from the transition metals. Use of Y as described in our application is not mentioned. Particularly mentioned perovskite oxidation catalysts are $GdCoO_3$ and $GdCeCoO_3$. Ce is known to be rather hydroscopic. In ammonia oxidation applications more cobalt than "A-site" cations will be lost through evaporation. Therefore, at some stage A-site oxides will precipitate. When the reactor is periodically shut down, the catalyst is exposed to water vapour from the ambient environment. This will lead to hydration of susceptible metal oxides and to a physical/mechanical breakdown of the catalyst.

This patent application do also relate to oxidation processes and both oxidation of hydrocarbon and ammonia is mentioned. The problem they want to solve, however, is to reduce sulphur poisoning of perovskite oxidation catalysts, as sulphur poisoning reduces both activity and selectivity. The problem is solved when A and B cations in perovskite oxidation catalysts are selected so that at the operating temperature of the process a stable metal sulphate does not form.

In Baiker et al; "Influence of the A-site cation in $ACoO_3$ (A=La, Pr, Nd and Gd) perovskite-type oxides on catalytic activity for methane combustion", Journal of Catalysis (1994), 146(1), p. 268-76 the effect of rare earth ions (La, Pr, Nd and Gd) in $ACoO_3$ perovskite-type catalysts on thermal behaviour and on catalytic activity for methane oxidation is discussed.

Zhao Fuhou, Lu Caiyun, Li Wan; "Rare earth element-containing perovskite-type catalysts for catalytic oxidation of pyridine", Environmental Chemistry (1987), 6(4), 16-20. The catalytic effect of rare earth containing perovskite compounds in the oxidation of pyridine has been studied. $DyCoO_3$, $LaCoO_3$, $DyMnO_3$ and $GdCoO_3$ were found to have good efficiency in the conversion of pyridine.

Viswanathan et al., "Kinetics and mechanism of carbon monoxide oxidation on rare earth ortho-cobaltites". Indian Journal of Technology (1984), 22(9), p. 348-52. A tentative mechanism for the catalytic oxidation of CO on $LnCoO_3$ (Ln=La—Ho) was proposed.

Examples of other catalysts and reactions are mentioned below:

U.S. Pat. No. 3,888,792 describes a cobalt spinel oxide, $Co_3O_4$, combined with a scandium, yttrium or rare earth oxide support phase. Thus, this is composite material containing two or more oxides and where the cobalt in the active catalyst remains in the spinel structure and is not a catalyst with perovskite structure as described in the present invention. The catalyst can be used in industrial oxidation processes as for example ammonia oxidation, but none of the examples give any results comparable to the use of gauzes. There is no hint to how to obtain more efficiency in conversion rate or low levels of $N_2O$. The problem they want to solve according to this patent is to obtain a catalyst with better mechanical strength, but the mechanical strength problem is different from in our application where swelling of the catalyst should be avoided.

Zhang et al, Journal of the Chinese Ceramic Society, Vol 40, February 2012, pages 289 to 293, describes a single phase mixed oxide containing yttrium (or yttrium and gadolinium), barium and cobalt $Y_{1-x}Gd_xBaCoO_{7+d}$. The structure is hexagonal with lattice parameters of circa 6.29 and 10.25 Å. The metal ratio between (Y+Gd): Ba: Co is 1:1:4, with oxygen content from 7 to 7.2. In this structure the yttrium and gadolinium have a 3+ valence state; the barium has a two plus valence state. For charge balance the average oxidation state of the cobalt is between 2.25 and 2.35. The structure also possesses four distinct metal sites within the lattice. One site occupied by yttrium and gadolinium, one site occupied by barium and two sites occupied by cobalt. This structure is very distinct from our $Y_{1-x}Gd_xCoO_3$ phase. The $Y_{1-x}Gd_xCoO_3$ may be considered to be an $ABO_3$ phase, where the Gd and or Y occupy the A site and the cobalt occupies the B site. The average oxidation state of cobalt in the $Y_{1-x}Gd_xCoO_3$ is 3. Thus, both compositions, crystal structure and use is quite another than according to our invention. There is neither any hint to the use of these structures as catalytically active components.

US patent application 2012/0088936 describes a catalyst with a general formula $Ln_2M_yCu_{1-x-y}Pd_xO_{4+-d}$. This phase is classified as a Ruddlesden-Popper phase, which have a general formula $A_{n+1}B_nO_{3n+1}$, where n is an integer (i.e. it is an $A_2BO_4$ type structure). In the case of the US patent, n=1, A=(La, Pr, Nd, Sm or Eu) plus (Y, Ce, Yb, Ca, Sr or Ba), and M=Cr, Mn, Fe, Co, Ni and Al. The structure also contains copper and palladium. This phase is quite distinct from our $Y_{1-x}Gd_xCoO_3$, which has an $ABO_3$ ortho-cobaltate structure. Thus, this patent describes a catalyst with another structure and there is no hint to that it could have been used as oxidation catalyst or especially for ammonia oxidation, either.

SUMMARY OF INVENTION

The object of the invention is to find an oxide system suitable to be used as oxidation catalyst. A further object is to find a catalyst especially for ammonia oxidation where problems with swelling of the catalyst are avoided. Still a further object is to find a catalyst with high selectivity towards NOx and giving low levels of the undesired $N_2O$.

These and other objects of the invention are obtained by the oxide systems as described in the enclosed patent claims.

The invention thus concerns stable, single phase oxides, based on a mixed yttrium-gadolinium ortho cobaltate oxide system with the general formula $Y_{1-x}Gd_xCo_{1-y}M_yO_3$, where 1>X>0, 0≤Y<1, and M is a metal selected from the group consisting of manganese, iron, chromium, vanadium and titanium, aluminium or a transition metal, or an alkaline earth metal (Group IIA of the periodic table). Preferably, the oxide system has the general formula $Y_{1-x}Gd_xCoO_3$, where 1>X>0 or $Y_{1-x}Gd_xCo_{1-y}Mn_yO_3$, where 1>X>0, 0<Y<1.

Preferred compositions are $Y_{0.75}Gd_{0.25}CoO_3$, $Y_{0.5}Gd_{0.5}CoO_3$, $Y_{0.25}Gd_{0.75}CoO_3$, $Y_{0.75}Gd_{0.75}CoO_{0.9}Mn_{0.2}O_3$, $Y_{0.25}Gd_{0.75}Co_{0.8}Mn_{0.2}O_3$ or $Y_{0.25}Gd_{0.75}Co_{0.7}Mn_{0.3}O_3$. These oxides are preferably used for catalysing the oxidation of ammonia in the Ostwald process or as catalysts for the oxidation of hydrocarbons.

The invention also concerns a catalyst especially for the oxidation of ammonia or hydrocarbon, with a refractory support phase and a catalytically active single phase oxide. The stable, single phase oxide is based on a mixed yttrium-gadolinium ortho-cobaltate oxide systems of the formula $Y_{1-x}Gd_xCo_{1-y}M_yO_3$, where 1>X>0, 0≤Y<1, and M is a metal selected from the group consisting of manganese, iron, chromium, vanadium and titanium, aluminium, a transition metal, or an alkaline earth metal. Especially preferred are catalysts where the oxide phase has the general formula $Y_{1-x}Gd_xCoO_3$ where 1>X>0, or $Y_{1-x}Gd_xCo_{1-y}Mn_yO_3$, where 1>X>0, 0<Y<1 or where the compounds $Y_{0.75}Gd_{0.25}CoO_3$, $Y_{0.5}Gd_{0.5}CoO_3$ or $Y_{0.25}Gd_{0.75}CoO_3$ $Y_{0.25}Gd_{0.75}Co_{0.9}Mn_{0.1}O_3$, $Y_{0.25}Gd_{0.75}Co_{0.8}Mn_{0.2}O_3$, $Y_{0.25}Gd_{0.75}Co_{0.7}Mn_{0.3}O_3$.

It is preferred to use a refractory support phase which includes cerium dioxide, zirconium dioxide, alumina, yttrium oxide, or gadolinium oxide, or a mixed oxide of these refractory oxides, or silicon carbide, or sodium zirconium phosphate type phases.

The invention also concerns an oxidation reaction that is carried out in presence of a catalyst comprising a component with the general formula $Y_{1-x}Gd_xCo_{1-y}M_yO_3$. Preferably this is a method for the oxidation of ammonia in the Ostwald where a gas blend comprising ammonia and oxygen is converted in presence of the catalyst. It is preferred that the catalyst has a selectivity towards NOx (NO+NO$_2$) exceeding 90%, and a selectivity towards $N_2O<0.05\%$.

DETAILED DESCRIPTION OF THE INVENTION

The current invention is a catalyst for high temperature ammonia oxidation, which is resistant to the hydration issues of lanthanum containing mixed oxides as discussed above. An evaluation of the hydration resistance of large metal ions that may adopt a trivalent oxidation state shows that the following are candidates;

Scandium, yttrium, gadolinium, terbium, dysprosium, holmium, erbium, ytterbium and lutetium.

Scandium is eliminated as it is too small to form an ortho-cobaltate phase. Terbium, dysprosium, holmium, erbium, ytterbium and lutetium are suitable in terms of their ionic radii and hydration resistance, but they are very expensive. However, yttrium and gadolinium meet the set requirement in terms of ionic radii, when in the trivalent oxidation state, and their hydration resistance.

Yttrium and cobalt, in a 1:1 mole ratio form a stable orthorhombic phase $YCoO_3$—yttrium ortho-cobaltate. When this mixed oxide phase is tested under industrially relevant ammonia oxidation conditions (a feed-stock containing 10% ammonia, 18% oxygen and a balance of inert gas or nitrogen, at a temperature of 900° C.), it combusts ammonia to a mixture of NOx (NO+NO$_2$), N$_2$ and N$_2$O. However, the selectivity towards the nitrogen containing oxides that are desired in the production of nitric acid (NOx) is lower than that obtained by platinum-based catalysts and is in the range of 91.3%.

Examination of the $YCoO_3$ phase prior to and after the ammonia oxidation test, using X-ray powder diffraction, shows clearly that there has been a reduction of the $YCoO_3$ phase $$2YCoO_3 \rightarrow Y_2O_3 + 2CoO \quad (1)$$

It is known that the CoO phase demonstrates some activity towards ammonia oxidation, but the selectivity towards desired NOx products is low-high levels of $N_2$ and $N_2O$ are produced.

Thermo-gravimetric analysis of the $YCoO_3$, in air shows that the $YCoO_3$ phase reduces according to equation 1, at a temperature of 970° C. When combusting ammonia at 900° C., as in industrial plants, the 900° C. temperature is that of the product gas directly downstream of the catalyst. The temperature of the catalyst is significantly higher than the gas temperature. Therefore, pure $YCoO_3$ is not sufficiently stable for use as an industrial ammonia oxidation catalyst.

Gadolinium and cobalt in a 1:1 mole ratio form a monoclinic phase $GdCoO_3$. When this mixed oxide phase is tested under industrially relevant ammonia oxidation conditions, as described above, it combusts ammonia to a mixture of NOx (NO+NO$_2$), N$_2$ and N$_2O$. However, the selectivity towards the nitrogen containing oxides that are desired in the production of nitric acid (NOx) is lower than that obtained by platinum-based catalysts and is in the range of 84.8%. Such catalysts are for example described in WO 2006010904 A1, where several perovskite oxidation catalysts are disclosed.

The invention will be further described through the following non-limiting examples:

EXAMPLE 1

Samples of the $Y_{1-x}Gd_xCoO_3$ catalysts were tested for their catalytic performance towards ammonia combustion, in a laboratory test reactor system. They were found to be active towards ammonia combustion with a high selectivity towards the desired NOx product.

TABLE 1

Performance of $Y_{1-x}Gd_xCoO_3$ mixed yttrium-gadolinium ortho-cobaltates, sintered at 900° C., towards ammonia combustion.

| Sample | Ignition temperature ° C. | Selectivity towards NOx % | N$_2$O emission ppm |
|---|---|---|---|
| $YCoO_3$ | 271 | 91.3 | 50 |
| $Y_{0.75}Gd_{0.25}CoO_3$ | 272 | 94.6 | 20 |
| $Y_{0.5}Gd_{0.5}CoO_3$ | 311 | 96.3 | 40 |
| $Y_{0.25}Gd_{0.75}CoO_3$ | 241 | 94.6 | 44 |
| $GdCoO_3$ | 279 | 84.8 | 55 |

Table 1 also shows the selectivity towards NOx and N$_2$O emissions for $YCoO_3$ and $GdCoO_3$ for comparison. These compounds are not part of the invention.

We observe that mixed yttrium-gadolinium ortho-cobaltate ($Y_{1-x}Gd_xCoO_3$) exhibits both high selectivity towards the desired NOx product, and low levels of the powerful N$_2$O greenhouse gas. X-ray powder diffraction analysis of the fresh and used yttrium-gadolinium ortho-cobaltates show that these phases had not undergone a reduction towards:

$$2Y_{1-x}Gd_xCoO_3 \rightarrow (1-X/2)Y_2O_3 + (X/2)Gd_2O_3 + 2CoO \quad (2)$$

Thus the doping of yttrium ortho-cobaltate with a reduction resistant gadolinium, leads to high selectivity towards NOx and low levels of the undesired N$_2$O, under industrially relevant oxidation conditions. The catalysts may be prepared by co-precipitation, complexation, combustion synthesis, freeze-drying or solid-state routes, or by other state-of-the-art methods of producing mixed-metal oxides.

In this context the composition $Y_{1-x}Gd_xCoO_3$ should be understood as the catalytically active component of a catalyst for use in a process for the oxidation of ammonia or the oxidation of hydrocarbons.

EXAMPLE 2

Samples of $Y_{1-x}Gd_xCo_{1-y}Mn_yO_3$ catalysts were tested for their catalytic performance towards ammonia combustion, in the laboratory test reactor system. Table 2 shows the selectivity towards NOx and N$_2$O emissions for $Y_{1-x}Gd_xCo_{1-y}Mn_yO_3$ where X=0.75 and Y=0, 0.1, 0.2 or 0.3.

TABLE 2

Performance of $Y_{1-x}Gd_xCo_{1-y}Mn_yO_3$ mixed yttrium-gadolinium ortho-cobaltates, sintered at 900° C., towards ammonia combustion.

| Sample | Ignition temperature ° C. | Selectivity towards NOx % | N$_2$O emission ppm |
|---|---|---|---|
| $Y_{0.25}Gd_{0.75}CoO_3$ | 241 | 94.6 | 44 |
| $Y_{0.25}Gd_{0.75}Co_{0.9}Mn_{0.1}O_3$ | 290 | 80.8 | 22 |

TABLE 2-continued

Performance of $Y_{1-X}Gd_XCo_{1-Y}Mn_YO_3$ mixed yttrium-gadolinium ortho-cobaltates, sintered at 900° C., towards ammonia combustion.

| Sample | Ignition temperature ° C. | Selectivity towards NOx % | N$_2$O emission ppm |
|---|---|---|---|
| $Y_{0.25}Gd_{0.75}Co_{0.8}Mn_{0.2}O_3$ | 265 | 93.3 | 23 |
| $Y_{0.25}Gd_{0.75}Co_{0.7}Mn_{0.3}O_3$ | 258 | 83.2 | 5 |

The selectivity towards NOx is lower for these samples containing Mn since there was some NH$_3$ slippage in these tests. However the N$_2$O levels are very low for these tests.

The catalysts according to the present invention can be used to catalyse several reactions. Examples of such uses are:

I. The catalysts may be used as oxidation catalysts,
II. as a catalysts for the selective oxidation of ammonia
III. as a catalysts for the oxidation of hydrocarbons
IV. as a catalysts for the complete oxidation of hydrocarbons to CO$_2$, in gas turbine power generation applications
V. as a catalysts for the complete oxidation of hydrocarbons to CO$_2$, at temperatures below 600° C., for the abatement of hydrocarbon emissions from vehicle exhaust gases.

Thus, the present invention also involves methods involving oxidation wherein a catalyst comprising the catalytically active component is used.

The present invention further involves the use of catalysts comprising the catalytically active component for e.g. the abatement of hydrocarbon emissions from vehicle exhaust gases.

The invention claimed is:

1. A catalytically active component of a catalyst, comprising a stable, single phase oxide of a mixed yttrium-gadolinium ortho-cobaltate oxide system of the formula $Y_{1-X}Gd_XCo_{1-Y}M_YO_3$, wherein 1>X>0, 0≤Y<1, and M is a metal selected from the group consisting of manganese, iron, chromium, vanadium, titanium, aluminum, a transition metal, and an alkaline earth metal.

2. The catalytically active component according to claim 1, wherein the oxide phase has the formula $Y_{1-X}Gd_XCoO_3$ wherein 1>X>0.

3. The catalytically active component according to claim 1, wherein the oxide phase has the formula $Y_{0.75}Gd_{0.25}CoO_3$, $Y_{0.5}Gd_{0.5}CoO_3$ or $Y_{0.25}Gd_{0.75}CoO_3$.

4. The catalytically active component according to claim 1, wherein the oxide phase has the formula $Y_{1-X}Gd_XCo_{1-Y}Mn_YO_3$, wherein 1>X>0, 0<Y<1.

5. The catalytically active component according to claim 4, wherein the oxide phase has the formula $Y_{0.25}Gd_{0.75}Co_{0.9}Mn_{0.1}O_3$, $Y_{0.25}Gd_{0.75}Co_{0.8}Mn_{0.2}O_3$, or $Y_{0.25}Gd_{0.75}Co_{0.7}Mn_{0.3}O_3$.

6. A catalyst for the oxidation of ammonia or a hydrocarbon, with a refractory support phase and a catalytically active single phase oxide, wherein the catalyst comprises a stable, single phase oxide of a mixed yttrium-gadolinium ortho-cobaltate oxide system of the formula $Y_{1-X}Gd_XCo_{1-Y}M_YO_3$, wherein 1>X>0, 0≤Y<1, and M is a metal selected from the group consisting of manganese, iron, chromium, vanadium, titanium, aluminum, a transition metal, and an alkaline earth metal.

7. The catalyst according to claim 6, wherein the oxide phase has the formula $Y_{1-X}Gd_XCoO_3$ wherein 1>X>0.

8. The catalyst according to claim 6, wherein the oxide phase has the formula $Y_{0.75}Gd_{0.25}CoO_3$, $Y_{0.5}Gd_{0.5}CoO_3$ or $Y_{0.25}Gd_{0.75}CoO_3$.

9. The catalyst according to claim 6, wherein the oxide phase has the formula $Y_{1-X}Gd_XCo_{1-Y}Mn_YO_3$, wherein 1>X>0, 0<Y<1.

10. The catalyst according to claim 6, wherein the oxide phase has the formula $Y_{0.25}Gd_{0.75}Co_{0.9}Mn_{0.1}O_3$, $Y_{0.25}Gd_{0.75}Co_{0.8}Mn_{0.2}O_3$, or $Y_{0.25}Gd_{0.75}Co_{0.7}Mn_{0.3}O_3$.

11. The catalyst according to claim 6, wherein the refractory support phase comprises cerium dioxide, zirconium dioxide, alumina, yttrium oxide, or gadolinium oxide, a mixed oxide of these oxides, silicon carbide, or sodium zirconium phosphate type phases.

12. A method involving an oxidation reaction, wherein the oxidation reaction is carried out in the presence of the catalytically active component according to claim 1.

13. A method for the oxidation of ammonia in an Ostwald process, comprising converting a gas blend comprising ammonia and oxygen in the presence of the catalytically active component according to claim 1.

14. The method according to claim 13, wherein the catalytically active component has a selectivity towards NOx (NO+NO$_2$) exceeding 90%, and a selectivity towards N$_2$O less than 0.05%.

15. A method for the complete oxidation of a hydrocarbon to CO$_2$, comprising carrying out an oxidation reaction in the presence of a the catalytically active component according to claim 1.

16. The method according to claim 15, wherein the oxidation reaction is carried out at temperatures below 600° C.

* * * * *